UNITED STATES PATENT OFFICE.

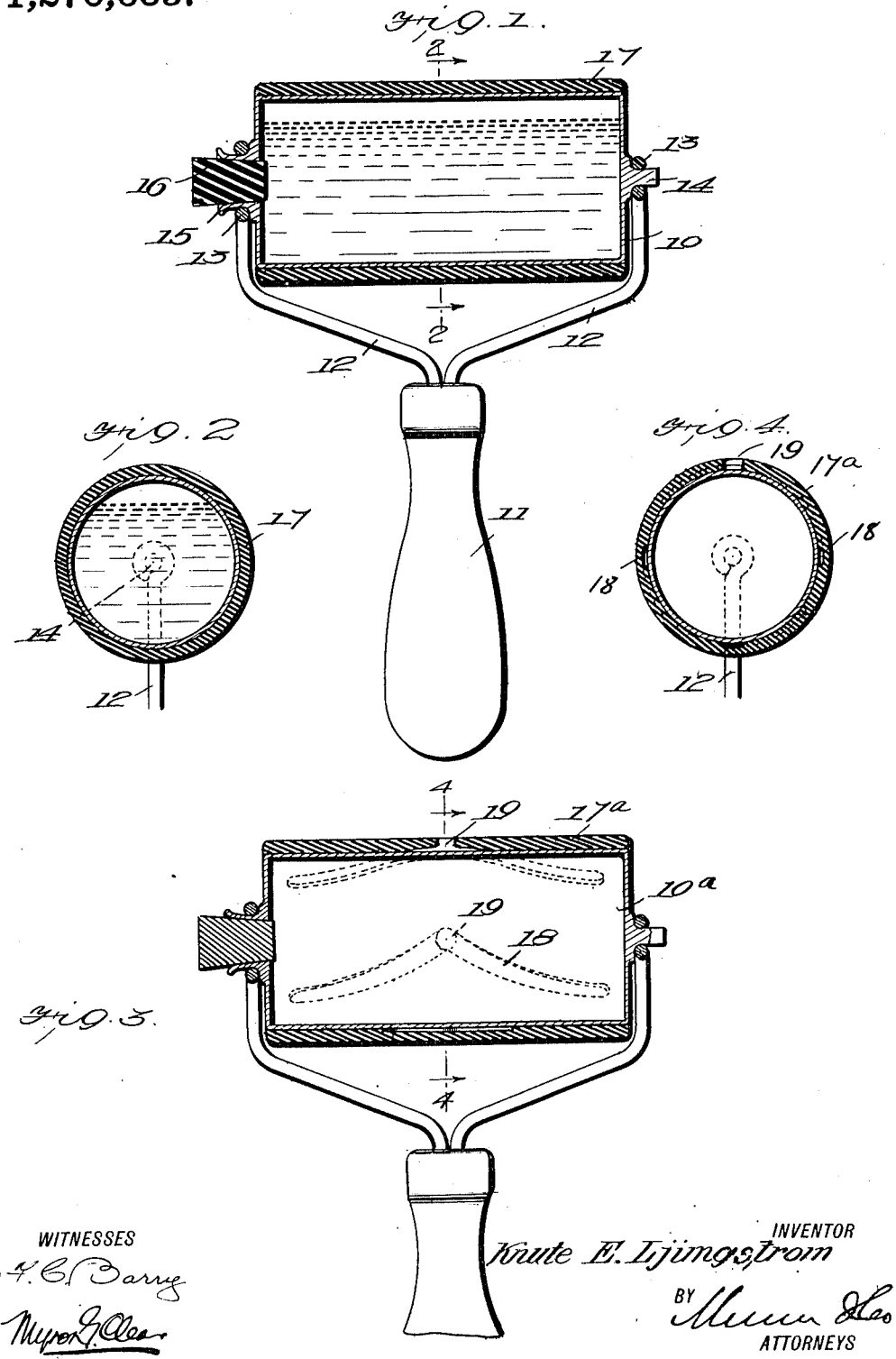

KNUTE E. LJUNGSTROM, OF WASHINGTON, DISTRICT OF COLUMBIA.

BEARD-SOFTENER.

1,270,635.  Specification of Letters Patent.  Patented June 25, 1918.

Application filed December 20, 1917. Serial No. 208,113.

*To all whom it may concern:*

Be it known that I, KNUTE E. LJUNGSTROM, a citizen of the United States, and a resident of the city of Washington, District of Columbia, have invented a new and useful Improvement in Beard-Softeners, of which the following is a specification.

My present invention relates to beard softeners, and more particularly to a beard softener in the form of a roller freely revolving with respect to a handle which is manipulated by the user, and having this roller so formed as to permit of the radiation of heat thereby to the face in order to assist in the softening of the beard in use, my object being the provision of a simple compact arrangement which will be inexpensive in the first instance and which will be economical in use.

A further and more specific object is the provision of a beard softener having a roller revolving with respect to a handle, which roller is in the form of a container, preferably cylindrical in shape, and having a filling aperture in order that hot water may be introduced therein for the purpose of radiating heat outwardly through the cylindrical wall of the container or roller, the latter forming a seat for a massage sleeve of soft or yielding material to enable ready and comfortable use of the roller upon the skin.

A still further and more specific object has to do with the particular construction of the sleeve of the roller, in order that it may gradually dispense small quantities of water or other softening fluids as the roller is moved over the face.

In the accompanying drawings illustrating my invention,

Figure 1 is a longitudinal section through my improved beard softener, the handle portion being in the main in elevation.

Fig. 2 is a vertical cross section taken on lines 2—2 of Fig. 1.

Fig. 3 is a view similar to Fig. 1, partly broken away, and illustrating a slightly modified form, and Fig. 4 is a transverse section taken on substantially the line 4—4 of Fig. 3.

Referring now to these figures, my invention contemplates the provision of a beard softening roller which is generally indicated at 10 in Figs. 1 and 2, revoluble with respect to a handle 11, the latter having a prong 12 provided with bearings 13 in alinement with one another and at the free ends of the prong, the latter being preferably formed of wire the extremities of which are bent in circular form in order to constitute the bearings 13.

The roller 10 is a hollow cylindrical structure of steel, and is provided with an axially projecting solid trunnion 14 at one end thereof, the opposite end having an axially projecting filling spout 15 which forms the other trunnion and is extended in revoluble relation through one of the bearings 13. This filling spout 15 receives a rubber cork or other closure member 16, capable of ready removal in order that the interior of the roller be filled or partly filled with hot water, and thus bring about a radiation through its cylindrical wall, and through a rubber or other soft yielding material sleeve 17, for which the cylindrical wall of the roller forms a seat.

In using the implement as seen in Figs. 1 and 2, the face is first moistened, and after the roller 10 has been filled or partly filled with hot water, and the filling spout 15 closed by member 16, the roller is moved over the face and repeatedly over the bearded area, the soft yielding sleeve 17 permitting of such movement in a comfortable convenient manner.

In Figs. 3 and 4 I have shown a slightly modified form in so far as the construction of the soft yielding sleeve is concerned, this sleeve being indicated at 17ª in Figs. 3 and 4, in the same relation to the hollow cylindrical roller 10ª as previously described, and shown as provided upon its inner face adjacent to the cylindrical wall of the roller, with angular grooves 18 terminating short of the ends of the roller and the sleeve and communicating at their inner ends with openings 19 radially through the sleeve. It is intended that in use this latter form of the invention shall be dipped in hot water which will run into the grooves 18 through the openings 19 and will afterward feed gradually out through the openings 19 as the implement is rolled upon the face.

It is obvious that in accordance with either form shown and described, my invention provides a simple inexpensive implement of this type both as regards its first cost and in use, which may be readily manipulated for the desired purpose without vexatious delays, and which will be strong and lasting.

I claim,

1. A beard softener comprising a handle having prongs, provided with bearings, a hollow cylindrical roller having an imperforate annular wall and a trunnion at one end engaging one of said bearings and a filling spout at its opposite end forming another trunnion, and engaging the other bearing, means for normally closing said filling spout, and a yielding contact sleeve supported around the periphery of said roller.

2. A beard softener including a hollow revoluble roller having a filling opening, and an imperforate annular wall, a yielding contact sleeve upon said roller and engaging said wall, said sleeve having grooves in its inner face adjacent to the outer face of the roller, and being provided with openings therethrough, and in communication with the said grooves, for the purpose described.

KNUTE E. LJUNGSTROM.